United States Patent
Fisi et al.

(10) Patent No.: US 10,749,970 B1
(45) Date of Patent: Aug. 18, 2020

(54) CONTINUOUS TASK-BASED COMMUNICATION SESSIONS

(71) Applicant: Wells Fargo Bank, N.A., San Francisco, CA (US)

(72) Inventors: Suzanne M. Fisi, Clayton, CA (US); Kristine Ing Kushner, Orinda, CA (US); Stephanie S. Hellman, Fairfax, CA (US); Joel Gardner, San Francisco, CA (US); John Chuprevich, Davidson, NC (US); Ayesha Hasan, San Francisco, CA (US); Darrell L. Suen, San Ramon, CA (US); Chris Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 194 days.

(21) Appl. No.: 15/392,772

(22) Filed: Dec. 28, 2016

(51) Int. Cl.
*G06F 15/173* (2006.01)
*H04L 29/08* (2006.01)
*H04W 12/06* (2009.01)

(52) U.S. Cl.
CPC ............ *H04L 67/148* (2013.01); *H04L 67/18* (2013.01); *H04W 12/06* (2013.01)

(58) Field of Classification Search
CPC ..... H04L 67/148; H04L 67/142; H04L 67/18; H04L 67/22; H04L 67/306; H04W 12/06; H04W 4/02; H04W 4/80; H04W 76/00; G06F 21/41; G06Q 20/18; G06Q 20/3223; G06Q 20/3278; G06Q 30/00; G06Q 30/0609

USPC ......... 709/201–206, 223, 226–229; 715/748, 715/751, 753, 758
See application file for complete search history.

(56) References Cited

U.S. PATENT DOCUMENTS

| | | | |
|---|---|---|---|
| 7,676,583 B2 | 3/2010 | Eaton et al. |
| 7,809,842 B2 | 10/2010 | Moran et al. |
| 8,800,007 B1 | 8/2014 | Rajagopalan |
| 9,130,922 B2 | 9/2015 | Fushman et al. |
| 9,197,600 B2 | 11/2015 | L'Heureux et al. |
| 9,246,863 B2 | 1/2016 | Eom et al. |

(Continued)

FOREIGN PATENT DOCUMENTS

WO 2006045323 A1 5/2006

OTHER PUBLICATIONS

Stahle, Thomas et al., Real-Time Multimedia Session Splitting and Seamless Mobility in Session Initiation Protocol Environments, MMEDIA 2011: The Third International Conferences on Advances in Multimedia, 2011, pp. 136-141.

(Continued)

*Primary Examiner* — Dustin Nguyen
*Assistant Examiner* — Hao H Nguyen
(74) *Attorney, Agent, or Firm* — Merchant & Gould P.C.

(57) ABSTRACT

A method for managing a communication session includes receiving a request to perform a task. The task is divided into one or more steps. One or more user devices are identified that can be used to perform one or more of the steps. One or more communication channels are identified that are available to the one or more user devices. The communication session is permitted to switch from one or more of the user devices and communication channels to complete the one or more steps of the task while maintaining a continuity of the communication session.

17 Claims, 7 Drawing Sheets

(56) References Cited

U.S. PATENT DOCUMENTS

| | | | |
|---|---|---|---|
| 9,277,017 B2 | 3/2016 | Burch et al. | |
| 9,306,930 B2 | 4/2016 | Keys et al. | |
| 9,479,491 B1 * | 10/2016 | Farnsworth | H04L 63/08 |
| 9,800,525 B1 * | 10/2017 | Lerner | H04L 51/36 |
| 2003/0055977 A1 * | 3/2003 | Miller | H04L 29/06 |
| | | | 709/227 |
| 2004/0061718 A1 * | 4/2004 | Fitzpatrick | H04L 51/04 |
| | | | 715/758 |
| 2006/0075003 A1 | 4/2006 | Adams et al. | |
| 2009/0063690 A1 | 3/2009 | Verthein et al. | |
| 2010/0311401 A1 * | 12/2010 | Oh | H04W 4/16 |
| | | | 455/417 |
| 2011/0219105 A1 | 9/2011 | Kryze et al. | |
| 2012/0131212 A1 | 5/2012 | Tang et al. | |
| 2012/0265679 A1 | 10/2012 | Calman et al. | |
| 2012/0311459 A1 * | 12/2012 | Prudente | H04L 51/14 |
| | | | 715/748 |
| 2013/0102250 A1 * | 4/2013 | Mutikainen | H04W 4/00 |
| | | | 455/41.2 |
| 2013/0318249 A1 * | 11/2013 | McDonough | H04L 67/02 |
| | | | 709/228 |
| 2014/0156854 A1 | 6/2014 | Gaetano, Jr. | |
| 2014/0189055 A1 | 7/2014 | Etchegoyen | |
| 2014/0289415 A1 * | 9/2014 | Chan | G06F 16/1787 |
| | | | 709/226 |
| 2014/0359735 A1 | 12/2014 | Lehmann et al. | |
| 2015/0026351 A1 | 1/2015 | Calman et al. | |
| 2015/0163254 A1 * | 6/2015 | Romero | H04L 47/10 |
| | | | 709/227 |
| 2015/0178822 A1 * | 6/2015 | Babiarz | G06Q 30/00 |
| | | | 705/26.7 |
| 2015/0381740 A1 | 12/2015 | Gwin et al. | |
| 2016/0033308 A1 * | 2/2016 | Wiessflecker | H04W 4/70 |
| | | | 702/127 |
| 2016/0060235 A1 * | 3/2016 | Tomizawa | A61K 31/197 |
| | | | 514/253.01 |
| 2016/0125490 A1 * | 5/2016 | Angal | G06Q 30/0609 |
| | | | 705/26.35 |
| 2016/0173617 A1 | 6/2016 | Allinson | |

OTHER PUBLICATIONS

Rong, L. et al., Application Level Session Hand-off Management in a Ubiquitous Multimedia Environment, e-Business and Telecommunication Networks, 2006, Springer, pp. 289-295.

QUALCOMM, Service Continuity Path to smooth user experiences, Jun. 2010, 8 pages.

* cited by examiner

CONTINUOUS TASK-BASED COMMUNICATION SESSIONS

BACKGROUND

Individuals commonly have access to a plurality of electronic computing devices, such as smartphones, desktop computers, laptop computers and tablet computers. The individuals can use these electronic computing devices in a variety of ways for a variety of purposes.

Some of the electronic computing devices are better suited to some purposes than others. For example, desktop computers have larger screens than smartphones and may be better suited to viewing and editing documents. Smartphones typically are smaller than tablet computers, are easier to carry around and may be better suited to some mobile applications than tablet computers.

SUMMARY

Embodiments of the disclosure are directed to a method for managing a communication session, the method comprising: receiving a request to perform a task; dividing the task into one or more steps; identifying one or more user devices that can be used to perform one or more of the steps; identifying one or more communication channels available to the one or more user devices; and permitting the communication session to switch from one or more of the user devices and communication channels to complete the one or more steps of the task while maintaining a continuity of the communication session.

In another aspect, a method for managing a communication session comprises: receiving a first request from a smartphone to perform a task; dividing the task into one or more steps; identifying a first step of the task to be performed on the smartphone; establishing the communication session with the smartphone; determining that the smartphone has moved into a proximity of a desktop computer; when the smartphone has moved into the proximity of the desktop computer, transferring the communication session to the desktop computer while maintaining a continuity of the communication session; and performing a second step of the communication session on the desktop computer.

In yet another aspect, a server computer comprises: a processing unit; and system memory, the system memory including instructions which, when executed by the processing unit, cause the server computer to: receive a first request from an electronic computing device to perform a task; divide the task into one or more steps; identify one or more communication channels available to the one or more user devices; identify a first communication channel for performing a first step of the task; establish a communication session between the electronic computing device and the server computer using the first communication channel; generating a personal identification number (PIN) for a user at the electronic computing device; sending the PIN to the electronic computing device; receiving a second request from the electronic computing device to login to the server computer using a second communication channel, the second request including the PIN; verify a validity of the PIN; and after verifying the validity of the PIN, switch the communication session from the first communication channel to the second communication channel while maintaining a continuity of the communication session.

The details of one or more techniques are set forth in the accompanying drawings and the description below. Other features, objects, and advantages of these techniques will be apparent from the description, drawings, and claims.

DETAILED DESCRIPTION

Figure 1:
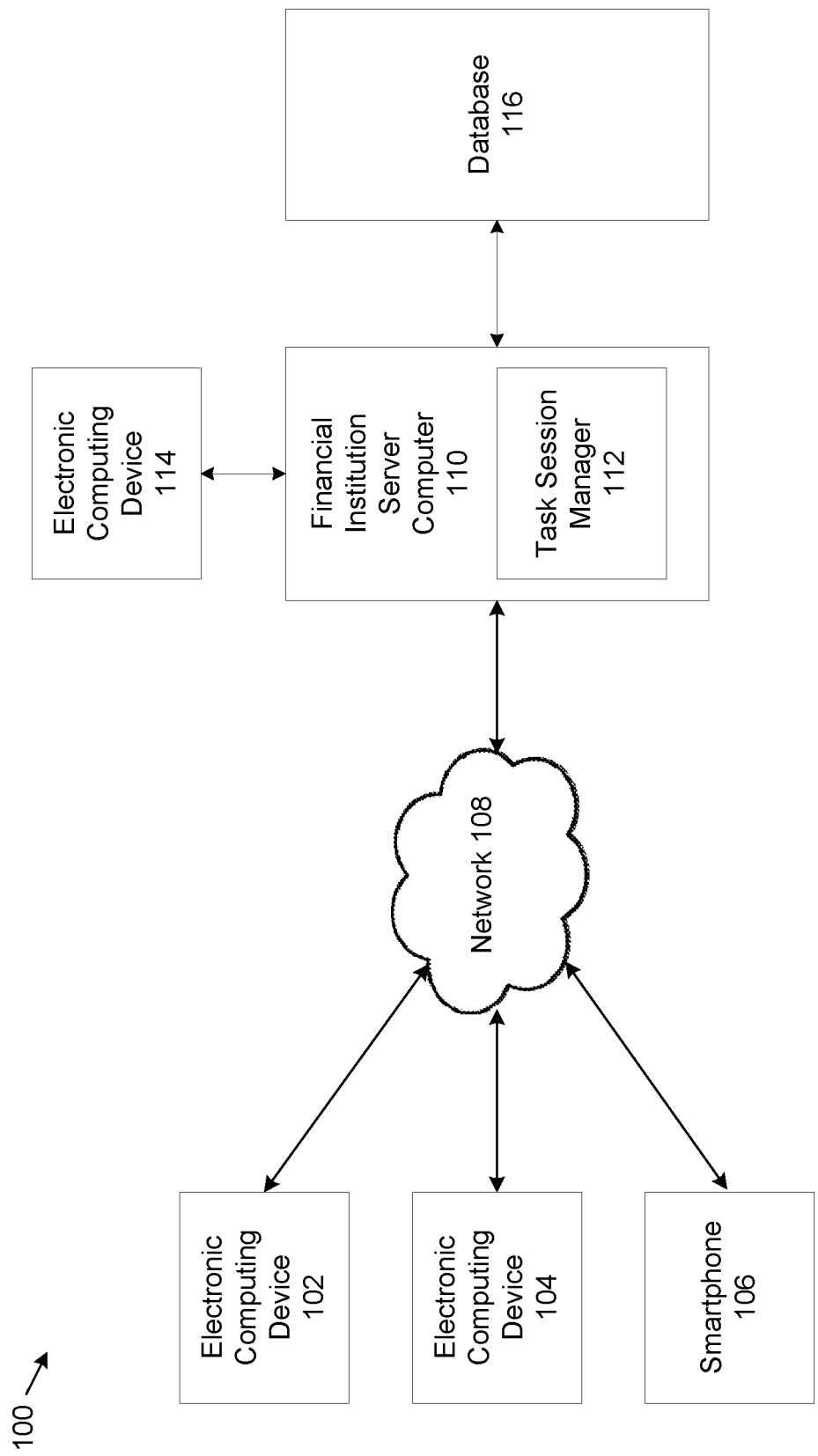
FIG. 1 shows an example system that supports a continuous task-based communication session.

The present disclosure is directed to systems and methods for providing continuous task-based communication sessions.

Using these example systems and methods, a customer of a business can establish a communication session, initiate a task at the business using one type of electronic computing device and seamlessly transfer the communication session to one or more other electronic computing devices to complete the task. The customer can also use a plurality of communication channels during the communication session. In addition, the customer can transfer the communication session to one or more individuals. When transferring the communication session to the electronic computing devices, communication channels or individuals, a continuity of the communication session can be maintained. Maintaining a continuity of the communication session comprises keeping the communication session active when the communication session is transferred to the electronic computing devices, communication channels or individuals.

A task session manager at a server computer of the business can identify one or more steps needed to complete the task. Each step can be assigned to an appropriate electronic computing device and communication channel for completing the task. The electronic computing devices can include smartphones, desktop computer, laptop computer and tablet computers. The communication channels can include voice, text, email and Internet. Other electronic computing devices and communication channels are possible.

In this disclosure, the systems and methods are described for a financial institution such as a bank. The customer can be a customer of the financial institution. However, the systems and methods can also be used for other organizations. For example, an employee of a business may be able to initiate filling out a form for the business on a desktop computer at a location of the business, receive an email on a smartphone that the employee needs to provide additional information on the form and provide the additional information via using the smartphone to email the business. As another example, a governmental organization may allow an individual to start an application for a license at a government service center and complete the application at home using a desktop computer or a laptop computer. Other examples are possible.

In an example implementation, the customer may be interested in applying for a mortgage at the financial institution. The customer can send a message, for example a Twitter message, also known as a tweet, to the financial institution using the customer's smartphone. The message can indicate that the customer wants to apply for a mortgage.

When a server computer at the financial institution receives the message, a task session manager can identify a task of a mortgage and can identify specific steps needed to complete the task. Example steps can be filling out a mortgage application, verifying customer financial information, meeting with a banker and closing on the mortgage. Other steps are possible.

The task session manager can establish a communication session with the customer's smartphone to confirm that the customer wishes to apply for a mortgage and to start the task for applying for the mortgage. The task session manager can also identify customer electronic computing devices, communication channels and other individuals that can be used to complete the specific steps of the task. For example, a form with many fields may be easier to complete using a desktop or laptop computer than a smartphone. As another example, certain steps may be able to performed when the customer is not stationary, for example using a smartphone to talk to a call center or a personal banker, whereas other steps that require entering text may be better able to perform when the customer is at a stationary location.

The task session manager can permit the customer to switch electronic computing devices and communication channels as appropriate. For example, when the customer is performing a task through a smartphone and moves into proximity of a trusted desktop computer, the task session manager can prompt the customer to switch the communication session to the desktop computer. The task session manager can also prompt the use to switch the communication channel from voice to an Internet (web-based) communication channel. Similarly, when the customer is performing a task on the desktop computer and the customer picks up an associated smartphone, the task session manager can prompt the customer to decide whether to move the communication session to the smartphone. In addition, the task manager can determine a location of the customer using global positioning system (GPS) software on the smartphone and dynamically switch a task from device to device based on a proximity of a detected device to the customer and an appropriateness in using the detected device.

The task session manager can permit the customer to transfer communication sessions in various ways. For example, when the computer accesses the server computer to initiate a task, a personal identification number (PIN) can be created for the customer. The PIN can be used when the customer attempts to access the communication session with a different device or a different communication channel. For example, when the communication session is initiated at a smartphone and the communication session is switched to a desktop computer, the customer can login to the server computer via the desktop computer by sending the PIN with a login request. In some implementations, the PIN can be location-based, wherein the PIN may only be valid at a certain geolocation or within a predefined distance of the geolocation. In some implementations, the PIN can be a one-time passcode that can only be used for one transfer. In other implementations, the PIN can be valid as long as the communication session is active.

Depending on the electronic computing device to which the communication session is to be switched to, specific types of PINS can be used. For example, for an automatic teller machine (ATM), a numeric PIN can be used, and, for a desktop computer, an alphanumeric password can be used. It is also possible to use biometric authentication in lieu of a PIN or password.

In some implementations, a quick response (QR) code or other type of image-based authentication can be used lieu of or in addition to a PIN or password. For example, the task session manager can include the QR code in an email message, a text message or a document and send the QR code to the customer device. The customer can include the QR code when transferring the communication session from one electronic computing device to another.

In lieu of a PIN, in another example, when switching a communication channel, a link can be forwarded to the customer for another communication channel. For example, a text or an email can be sent with a link to a web page that can be used as a communication channel. In addition, the task manager can include a rules engine that can determine an appropriate or optimal communication channel for various steps of the task.

The task session manager can support a user interface that can show the personal banker or other customer service representative at the financial institution a status of the communication session including known customer devices, available communication channels and current customer location. The customer service representative can decide to switch the communication session between devices and communication channels as conditions warrant.

As an example application, a continuous task-based session can be used to implement an online wealth management advisor. In an example implementation, the wealth management advisor can include two partners—a primary partner and an advisor partner. In this implementation, both the primary partner and the advisor partner can make trades; however the primary partner can have some capabilities, for example managing a retirement account, which the advisor partner does not have. One of the partners can be a customer of the financial institution.

The primary partner and the advisor partner can each have electronic computing devices associated with them. In addition, a geolocation can be designated for each electronic computing device, such that the primary partner and the advisor partner can only be authorized when their associated electronic computing device is at the designated geolocation (or in a predefined proximity of the designated geolocation).

A communication session can be initiated by either the primary partner or advisor partner and switched to the advisor partner or the primary partner, respectively, as conditions warrant. The task session manager can recognize the capabilities of an electronic computing device at a time of authentication and authorization. For example, the primary partner and the advisor partner may have assigned electronic computing devices and, in some implementations, only the assigned electronic computing devices may be used in the communication session.

The task manager can determine when the communication session can be switched from one electronic computing device to another. The task manager can request a confirmation of the switch from the primary partner or the advisor partner, depending upon the electronic computing device to be switched. When confirmed, the task manager can switch the communication session to the appropriate electronic computing device and send confirmation text to the electronic computing device. The task manager can also determine based on an authorization level of the primary partner, the primary partner may be able to override an action of the advisor partner.

In another aspect, the systems and methods can support a linked browsing session, whereby two users can have web pages linked together. In an example implementation, when one user accesses a web page, an electronic computing device of the second user can receive a notice of the web page and automatically access the web page. The web page can be a passive web page or a web page in which a user action can be taken.

The systems and methods disclosed herein are directed to a computer technology that can establish a communication session between an electronic computing device and a server computer to implement a task and maintain a continuity of the communication session across multiple electronic computing devices, communication channels and users. The use of multiple electronic computing devices and communication channels in a continuous task-based communication session can provide computing efficiencies because some electronic computing devices and communication channels are better suited to implementing steps of a task than others. For example, a smartphone can be an efficient way to provide status of the task to a user who is not at a stationary location. However, a laptop or desktop computer can be a more effective electronic computing device to use when filling out a form. Maintaining a continuity of the communication session also can improve efficiencies because an authentication/authorization process and other aspects of task implementation can be streamlined.

FIG. 1 shows an example system 100 that can support a continuous task-based communication session. System 100 includes an electronic computing device 102, an electronic computing device 104, a smartphone 106, a network 108, a financial institution server computer 110, an electronic computing device 114 and a database 116. Financial institution server computer 110 includes a task session manager 112. More, fewer or different components can be used.

The example electronic computing device 102 is an electronic computing device of a customer of a financial institution. Electronic computing device 102 can be one of a desktop computer, a laptop computer or a tablet computer.

The example electronic computing device 104 is an electronic computing device of another customer of the financial institution. In an example implementation, the customer associated with electronic computing device 104 can be a relative or friend of the customer associated with electronic computing device 102 and both can be associated with a financial transaction at the financial institution. For example, the financial transaction can be an application for a mortgage, a personal loan, a savings account, a checking account or another transaction. Electronic computing device 104 can be one of a desktop computer, a laptop computer, a tablet computer or a smartphone.

The example smartphone 106 is a mobile electronic computing device of the customer associated with electronic computing device 102. A communication session initiated at smartphone 106 can be switched to electronic computing device 102. Similarly, a communication session initiated at electronic computing device 102 can be switched to smartphone 106.

The example network 108 is a computer network such as the Internet. Electronic computing device 102, electronic computing device 104 and smartphone 106 can wirelessly connect to or otherwise access financial institution server computer 110 via network 108.

The example financial institution server computer 110 is a server computer at a financial institution such as a bank. The customer at electronic computing device 102 and the customer at electronic computing device 104 can have one or more financial accounts at financial institution server computer 110. Financial institution server computer 110 can also host a web site for the financial institution. More than one financial institution server computer can be used.

The example task session manager 112 establishes and managers communication sessions between electronic computing device 102, electronic computing device 104, smartphone 106 and financial institution server computer 110. As discussed in more detail later herein, the task session manager identifies steps of requested tasks, identifies devices and communication channels on which the steps of the task can be implemented and assigns the devices and communication channels to the steps of the task so that the steps of the task can be implemented. The task session manager also supports a user interface module for rendering a user interface on electronic computing device 114.

The example electronic computing device 114 is an electronic computing device of a customer service representative or a personal banker. The user interface can provide status information regarding a task, including displaying steps of the task, displaying which devices are assigned to each step, displaying which communication channels are assigned to each device for each step and displaying a completion status of the step. The user interface can also allow the customer service representative or personal banker to control aspects of the communication session, such as switching user devices, communication channels and users during the communication session. Other functionality for the user interface is possible.

The example database 116 is an electronic database that can store profile and financial account information for customers of the financial institution. More than one electronic database can be used.

Figure 2:
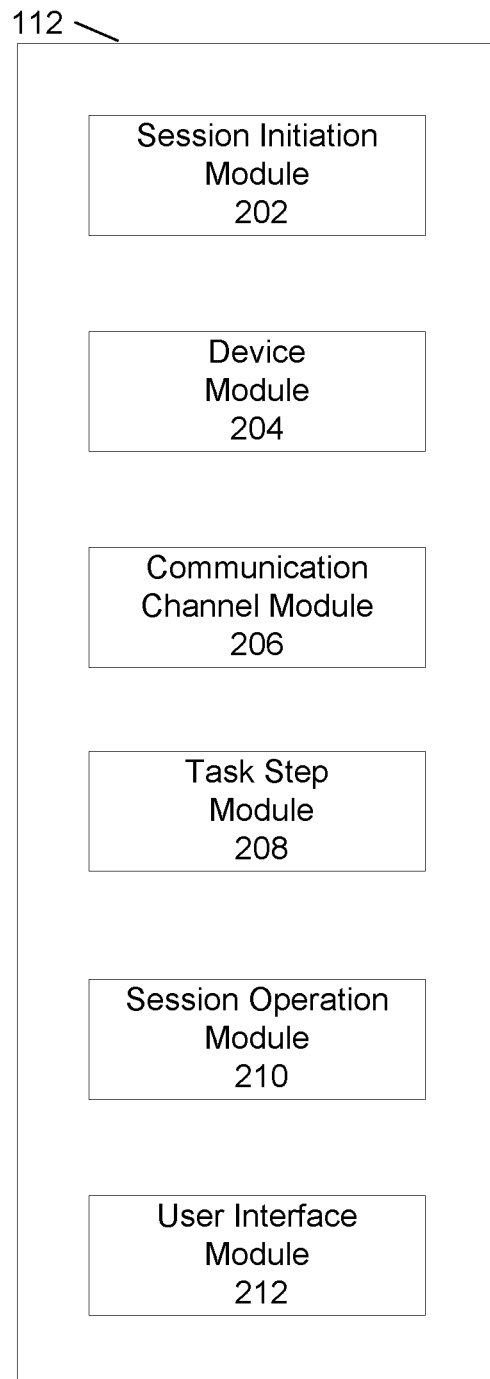
FIG. 2 show example modules of the task session manager of FIG. 1.

FIG. 2 shows example modules of task session manager 112. The example modules include a session initiation module 202, a device module 204, a communication channel module 206, a task step module 208, a session operation module 210 and a user interface module 212. More, fewer or different modules are possible.

The example session initiation module 202 initiates a communication session between a customer device and financial institution server computer 110 to implement a task. In an example implementation, the task comprises steps needed to implement a requested financial transaction. In the example implementation, the communication session is initiated by the customer, for example sending a request for the financial transaction to financial institution server computer 110. In one example, the customer at a desktop computer (electronic computing device 102) can access a web page for the financial institution and initiate an application for a personal loan or a mortgage from the web page. In another example, the customer at smartphone 106 can send a text message or a tweet to a call center of the institution and initiate the application for the personal loan, mortgage or other financial transaction from smartphone 106. The customer at smartphone 106 can also call a personal banker or customer service representative and request an initiation of the financial transaction.

The call center, personal banker or customer service representative can notify financial institution server computer 110 of the request to initiate the financial transaction. When the financial institution server computer 110 receives notification of the request to initiate the financial transaction, financial institution server computer 110 can initiate a communication session with the requesting customer device.

The example device module 204 identifies customer electronic computing devices that can be used to implement the steps of the task corresponding to the requested financial transaction. The electronic computing devices can consist of desktop computers, laptop computer, and mobile electronic devices such as tablet computers and smartphones. The electronic computing devices can comprise electronic computing device 102, electronic computing device 104 and smartphone 106. The electronic computing devices can be owned be owned or used by the customer, friends and family of the customer or business or other associates of the customer.

The example communication channel module 206 identifies communication channels that can be used by the customer electronic computing devices to implement the steps of the task.

Example communication channels can include voice, text, email, and web pages. Other communication channels are possible. The communication channel module 206 can assign a communication channel to a customer device for each step of the task and maintain a status of each communication channel.

The example task step module 208 receives the request for the financial transaction from the session initiation module 202 and identifies steps that can be performed to implement the task. The task step module 208 can also identify a person, for example the customer, the customer's spouse, an associate of the customer, etc. who can be assigned to perform the step. In addition, the task step module 208 can identify a customer device and communication channel that can be used to perform each step in the task.

The example session operation module 210 implements the task associated with the communication session. The session operation module 210 identifies steps that can comprise the task, determines a customer device and communication channel appropriate for the task, switches steps in the task between customer devices as appropriate and monitors status of the steps of the task. The session operation module 210 includes a rules engine that attempts to optimize an appropriate customer device and communication channel for each step of the task. The session operation module 210 can recognize a customer device when the customer device logs into or is otherwise known be financial institution server computer 110 and can determine capabilities of the customer device. The session operation module 210 can also scan each customer device and determine whether to allow the communication session to transition to the customer device. When a determination is made to transition the communication session to the customer device, the session operation module 210 can send a message to the customer device asking the user of the customer device to confirm the use of the customer device for the communication session.

The example user interface module 212 provides a user interface for the communication session that can be rendered on an electronic computing device of a personal banker or customer service representative, for example on electronic computing device 114. The user interface can display each step in the task, the customer device and communication channel assigned to the task and the status of each step of the task. The user interface can also permit the personal banker or customer service representative to select a customer device to be activated for a step of the task. When the task session manager receives a confirmation from the user of the customer device to activate the customer device for the step of the task, the user interface module 212 can show that the customer device is active for the step of the task.

Figure 3:
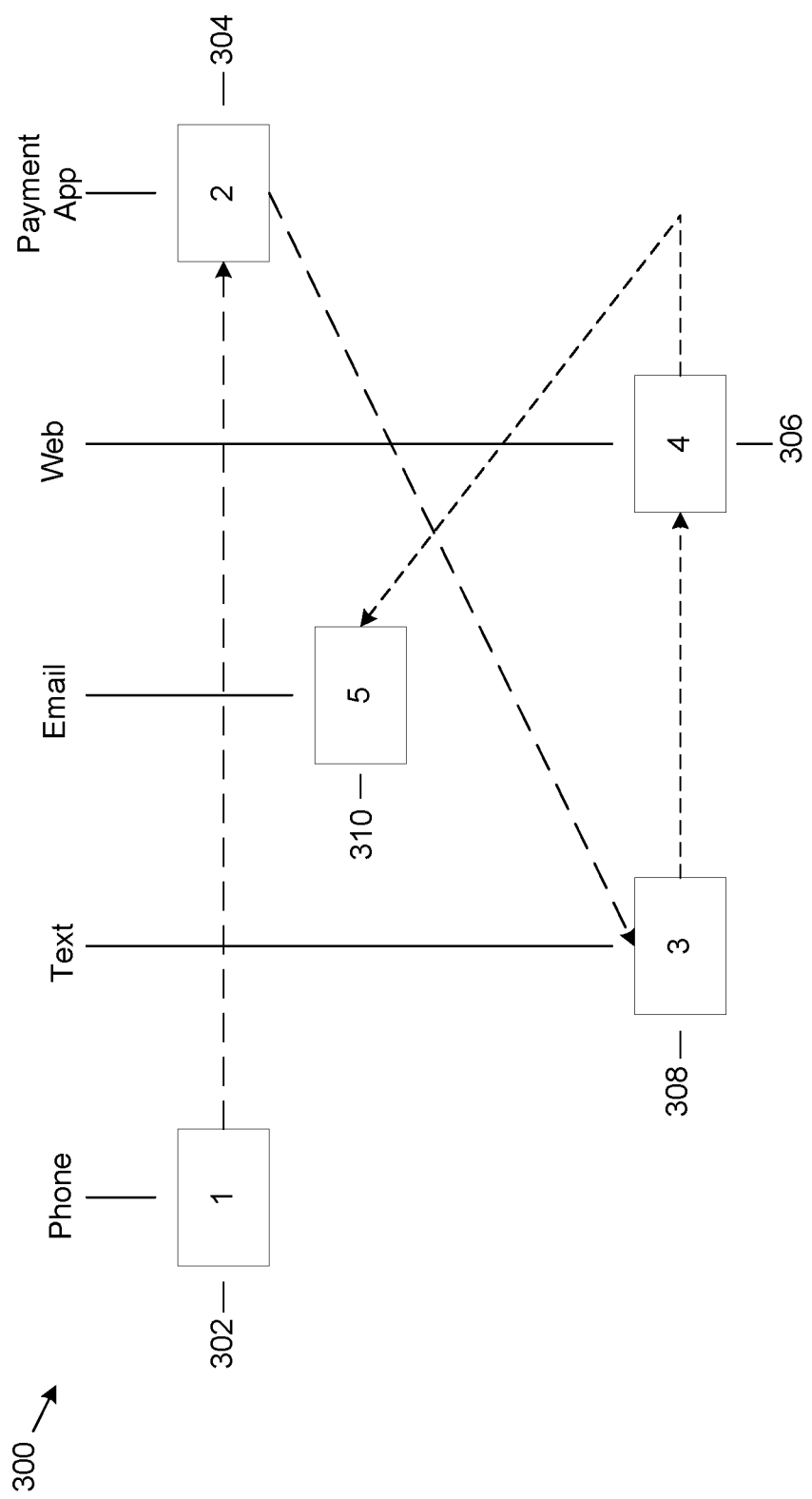
FIG. 3 shows an operations diagram for an example continuous task-based communication session.

FIG. 3 shows an example operations diagram 300. The operations diagram 300 shows an example of how steps of a task in a communications session can be switched to different devices and different communication channels during the execution of the task.

The operations diagram 300 shows communication channels of phone, text, email, web and payment application at the top of the operations diagram 300. The operations diagram 300 also includes rows that represent user devices. Each customer device on a same row represents the same customer device. For the example operations diagram 300, a first row, comprising steps 302 and 304 of the task, corresponds to a smartphone, a second row, comprising step 310, corresponds to a desktop computer and a third row, comprising steps 306 and 308 of the task, corresponds to a laptop computer.

In an example implementation, a customer at smartphone 106 implements a first step 302 of a task using smartphone 106. For example, the first step can be to call a customer service representative of a financial institution to request an increase in a credit limit of the customer's credit card so that the customer can purchase an item at a retail store. As a result of the call, the customer service representative can provide a temporary authorization for the increased credit card limit, can establish a task to increase the customer's credit card limit, and can provide the customer with a personal identification number (PIN) for the task.

The customer can go to the retail store and purchase the item, knowing that there will be a high enough limit on the credit card to cover the cost of the item. At a second step 304 of the task, the customer can pay for the item at the retail store using a payment app on smartphone 106. When the customer uses the payment app, the customer provides the PIN for the task. When the payment is processed, the PIN for the task permits a payment processing mechanism to learn that a temporary authorization has been approved to increase the credit limit on the customer's credit card.

After the customer makes the purchase at the retail store, the customer can travel to a friend's house and take along a tablet computer, for example electronic computing device 104. When at the friend's house, at a third step 306 of the task, the customer can use the tablet computer to view a text message from the financial institution that the increase to the credit limit of the customer's credit card has been approved. The text message can include a link to a web page that can provide confirmation information regarding the approval of the increased credit card limit. At a fourth step of the task, the customer can use the tablet computer, click on the link, access the web page and verify that the customer's credit limit on the credit card has been increased.

At a fifth step 310 of the task, the customer can return home and use a desktop computer to check the customer's email. One email message is from the financial institution. The email message informs the customer that a request has been made to increase the credit limit on the customer's credit card and that the request has been granted. The email also requests that the customer respond to a link in the email to confirm that the customer made the request and approves the request.

During implementation of the task as described above, the task session manager 112 can display each step, user device and communication channel on a user interface that can be rendered on electronic computing device 114. The customer service representative or personal banker at electronic computing device 114 can view the status of each step of the task and can communicate with the customer as appropriate. Operations diagram 300 shows one example of tasks that can be performed in a continuous task-based communication session. Other example tasks are possible.

Figure 4:
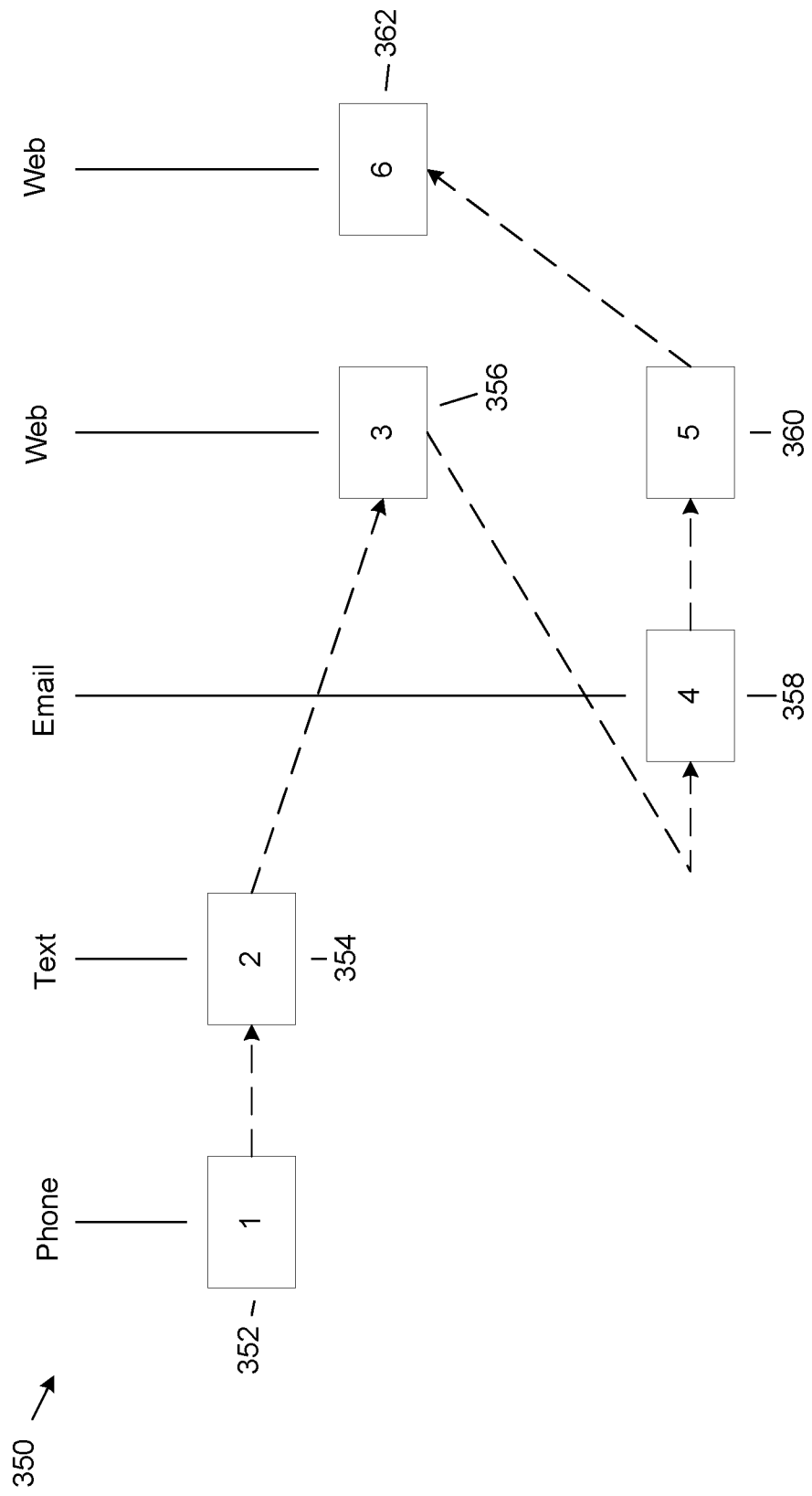
FIG. 4 shows another operations diagram for an example continuous task-based communication session.

FIG. 4 shows another example operations diagram 350. The operations diagram 350 shows another example of how steps of a task in a communications session can be switched to different devices and different communication channels during the execution of the task.

The operations diagram 350 shows communication channels of phone, text, email and web at the top of the operations diagram 350. The operations diagram 350 also includes rows that represent user devices. Each customer device on a same row represents the same customer device. For the example operations diagram 350, a first row, comprising steps 352 and 354 of the task, corresponds to a smartphone, a second row, comprising steps 356 and 362 of the task, corresponds to a desktop computer and a third row, comprising steps 358 and 360 of the task, corresponds to a tablet computer.

In an example implementation, the customer at smartphone 106 implements a first step 352 of the task using smartphone 106. For example, the customer may be at a house that that customer is interested in purchasing. The customer may have received approval for an offer on the house. As a result, the customer in the first step can call a customer service representative of the financial institution using smartphone 106 and initiate a mortgage application.

The customer can then leave the house and go to the customer's office. At the customer's office, at a second step 354 of the task, the customer can receive a text message on smartphone 106 from the customer service representative. The text message can indicate that the mortgage application has been initiated. The text message can also include a PIN to enable the customer to access and complete the mortgage application.

At a third step 356 of the task, the customer can use the desktop computer to login to a website for the financial institution and use the PIN to access the mortgage application. The customer can open the mortgage application and start filling it out. After a few minutes, the customer can suspend filling out the mortgage application and do work related tasks.

Around lunchtime, the customer can step away from his desk with smartphone 106 and with his tablet computer. At a fourth step 358 of the task, the customer can receive an email on the tablet computer with a link to the customer's mortgage application.

At a fifth step 360 of the task, the customer can access the mortgage application on the tablet computer using the link provided in the email. The customer can continue filling out the mortgage application while at lunch. After lunch, the customer can suspend working on the mortgage application and return to the customer's office.

Financial institution server computer 110 can determine from a location of smartphone 106 that the customer is back in the customer's office. When the customer accesses the financial institution from the customer's desktop computer, at a sixth step 362 of the task, financial institution server computer 110 can automatically display the mortgage application on the customer's desktop computer so that the customer can continue to work on the mortgage application.

Variations of example operation 350 are possible. In one example variation, financial institution server computer 110 may have access to the customer's home and work calendar. Financial institution server computer 110 can then find an open time at which the customer can work on the mortgage application. Financial institution server computer 110 can then automatically book a time in the customer's calendar that can be allocated for working on the mortgage application. In lieu of booking the time, financial institution server computer 110 can notify the customer of open times at which the customer can work on the mortgage application. Other variations of operation 350 and other example operations are possible.

Figure 5:
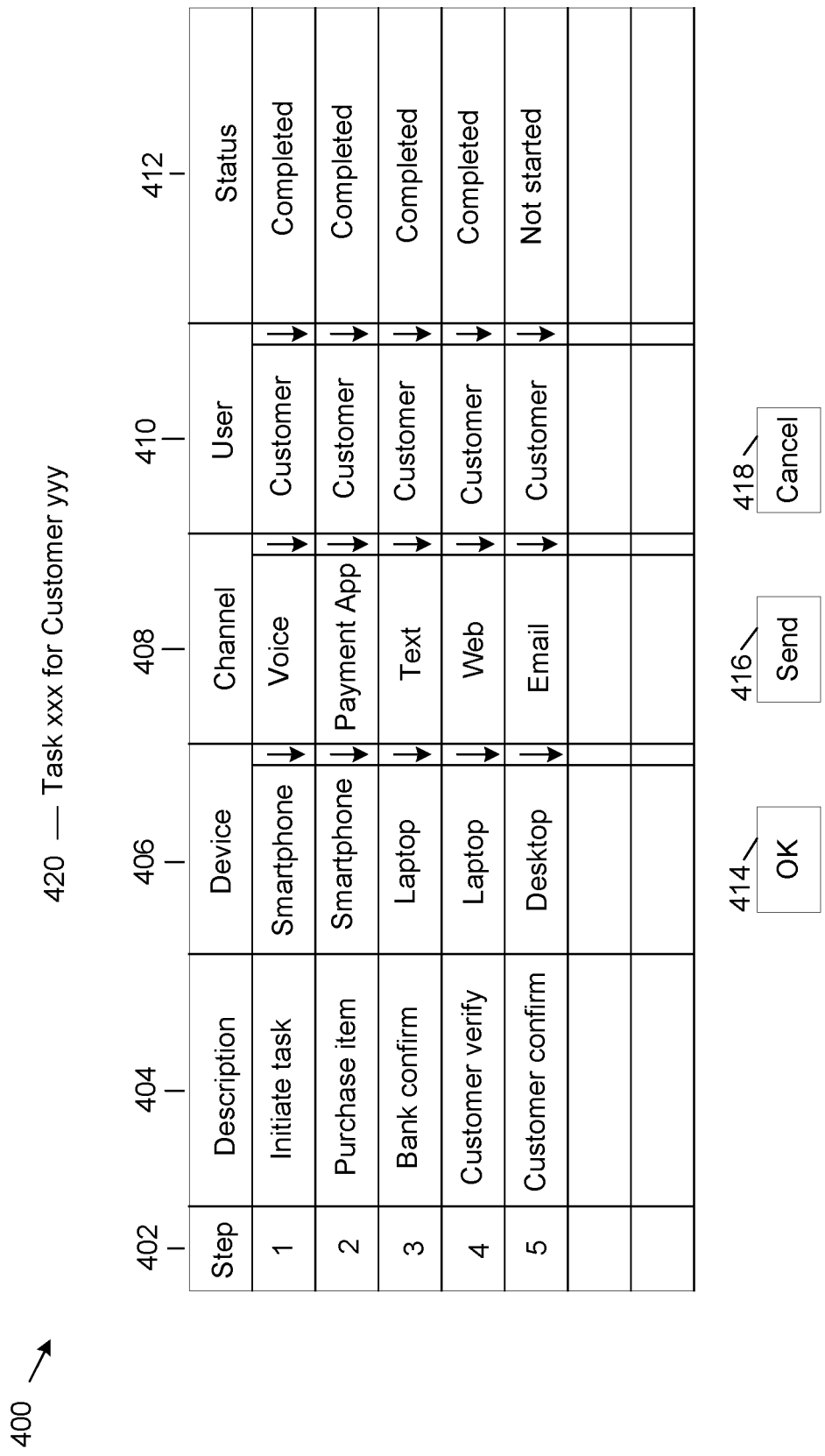
FIG. 5 shows a user interface that can be rendered on one of the electronic computing devices of FIG. 1.

FIG. 5 shows an example user interface 400 that can be rendered on electronic computing device 114. The user interface 400 can be rendered when the task session manager 112 receives a request for a financial transaction from the customer. The task session manager 112 can create a task corresponding to the financial transaction and create steps to implement the task. As shown in FIG. 5, the steps, descriptions, devices, channels and users for user interface 400 correspond to the example operations diagram 300 of FIG. 3.

The user interface 400 includes a header 402 that can provide a description of the task and an identifier for the customer. The identifier can be the customer's name or another identifier for the customer, such as a customer ID number.

The user interface 400 also includes columns for step 402, step description 404, channel 408, user 410 and status 412. Rows are included for each step of the task. The example step 402 column shows a step number. The example step description 404 column provide a description of each step. The example device 406 column indicates the customer device used to implement each step. The example channel 408 column indicates the communication channel used to implement each step. The example, user column 410 indicates a name for a user of the device 406 for each step. Example users can be the customer, the customer's spouse, a relative of the customer, a friend of the customer, a business associate of the customer or another designation. The example status 412 column shows a status for the step, typically either completed, pending or not started.

For the user interface 400, the device 406 column, channel 408 column and user 410 column include pull-down list boxes for each entry box in the column. At the right of each entry box for these columns is a pull-down arrow that permits a user of an electronic computing device to select an entry. Example entries for the device 406 column can be smartphone, laptop, tablet and desktop. Example entries for the channel 408 column can be voice, payment app, text, web and email. Example entries for the user column can be customer, spouse, brother, sister, relative, friend and associate. Other entries are possible for each of these columns.

Typically, the task session manager 112 can display one of these entries. However, the customer service representative or personal banker can also select one or more of these entries, using the pull-down arrow. For example, the customer service representative can select an entry and click the entry to highlight it. The entry can be finalized by clicking an OK 414 button. The entry can be canceled by clicking a Cancel 416 button. In addition, a message can be sent to the selected device 406 by clicking the Send 418 button. For example, the message can request that the user of the selected device 406 confirm the selection of the selected device 406, the selected channel 408 and the selected user 410 for a currently active step of the task.

Figure 6:
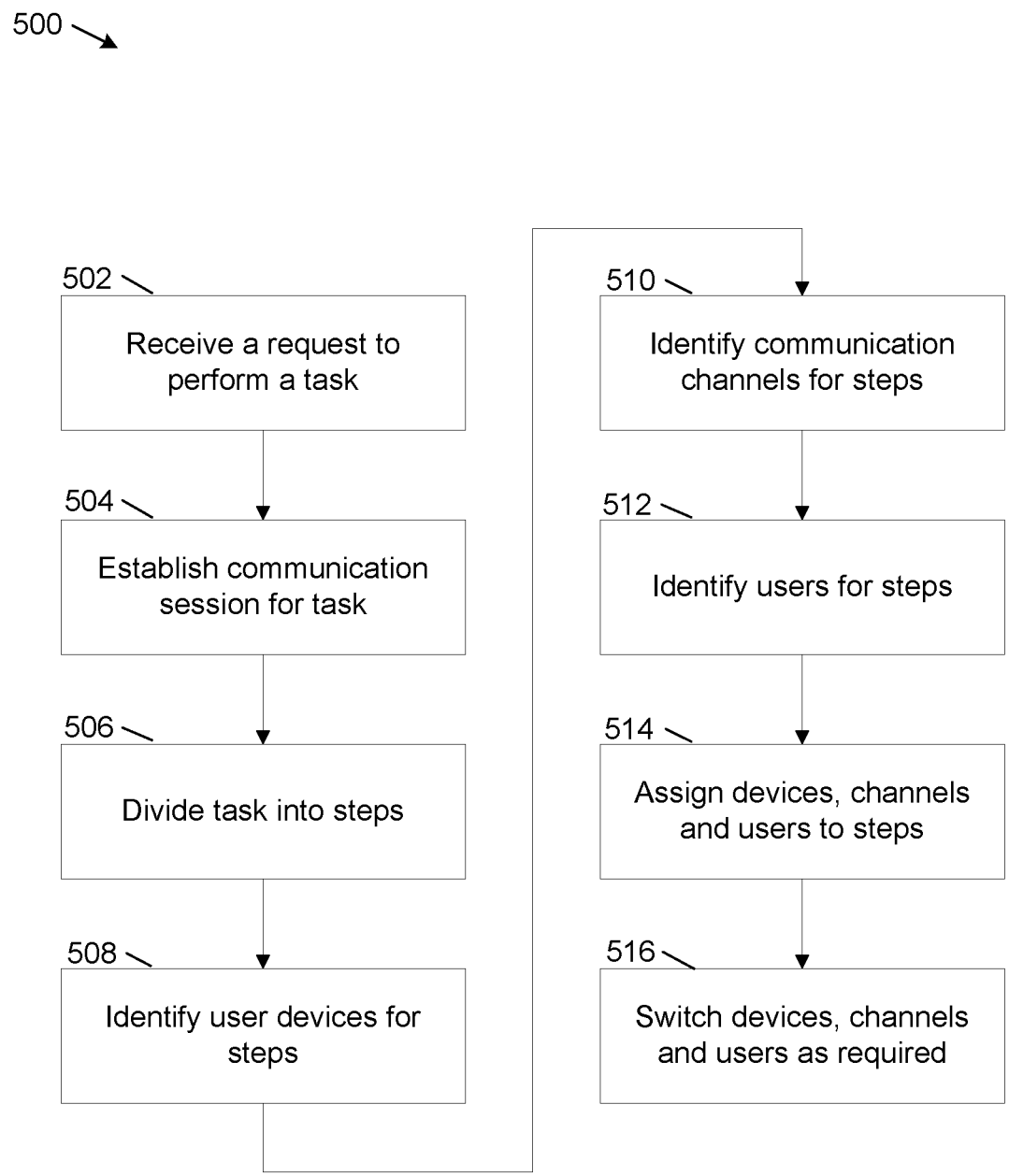
FIG. 6 shows a method for implementing a continuous task-based communication session.

FIG. 6 shows a flowchart of an example method 500 for establishing and using a continuous task-based communication session.

At operation 502, a request is received at a server computer to perform a task. For method 500, the server computer is a server computer at a financial institution, the task is a financial transaction and the request is received from an electronic computing device of a customer of the financial institution. For method 500, the server computer is financial institution server computer 110. The financial transaction can be any financial transaction that can be performed at the financial institution and that can be broken up into steps. Example financial transactions can include applying for a mortgage, a personal loan or a credit card, opening up a checking or savings account and requesting an increase of a credit limit on a credit card. Other financial transactions are possible.

At operation 504 a communication session is established for the task. The communication session is established between the electronic computing device requesting the task and the server computer, for example between smartphone 106 and financial institution server computer 110.

At operation 506, the task is divided into steps. The steps are those than can be performed by a user on an electronic computing device of a customer using an available communication channel.

At operation 508, available user electronic computing devices are identified that can be used to implement the steps of the task. Example available electronic computing devices can include smartphones, desktop computers, laptop computers and tablet computers. Other user devices are possible.

At operation 510, available communication channels are identified that can be used for the steps of the task. Example available communication channels can include voice, text, email, Internet and software applications. Other communication channels are possible.

At operation 512, users are identified for the steps of the task. Examples users can include the customer, the spouse of the customer, relatives of the customer and associates of the customer. Other users are possible.

At operation 514, devices, channels and users are assigned to the steps of the task. The assignments can be made a task manager of the server computer, for example by task session manager 112 of financial institution server computer 110. Task session manager 112 can use a rules engine to determine an optimal combination of devices, channels and users for the steps of the task. The devices, channels and users can also be manually assigned by a customer service representative of the financial institution.

At operation 516, devices, channels and users are switched in the communication session as required. In some cases, one or more devices, channels and users are switched by task session manager 112. In other cases, one or more devices, channels and users are switched manually by the customer service representative. The task session manager 112 and the customer service manager can determine whether a device, channel or user is to be switched based on the type of task being performed and based on conditions that occur during implementation of the steps of the task.

Figure 7:
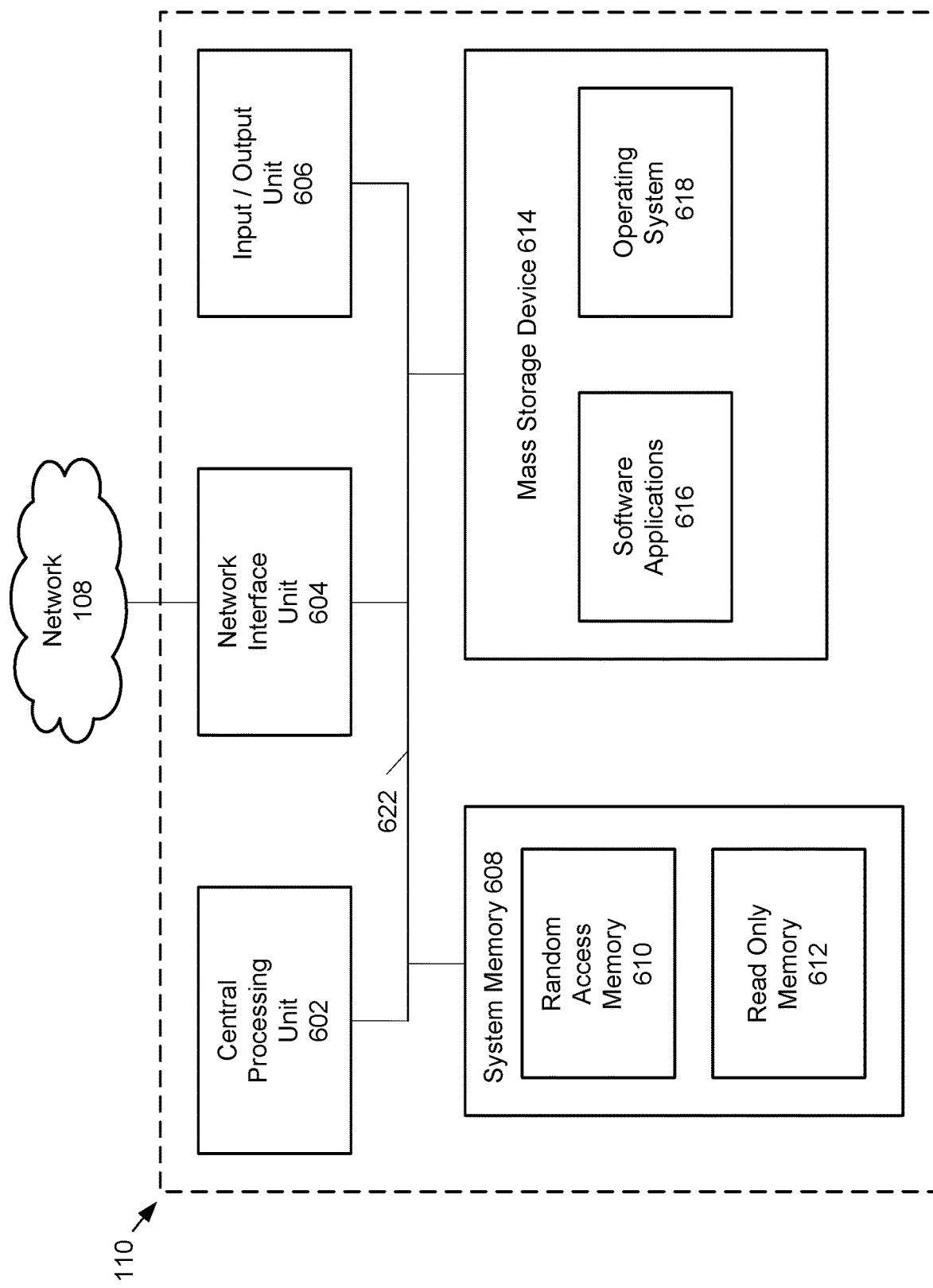
FIG. 7 shows example physical components of the financial institution server computer of FIG. 1.

As illustrated in the example of FIG. 7, financial institution server computer 110 includes at least one central processing unit ("CPU") 602, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the financial institution server computer 110, such as during startup, is stored in the ROM 612. The financial institution server computer 110 further includes a mass storage device 614. The mass storage device 614 is able to store software instructions and data. Some or all of the components of the financial institution server computer 110 can also be included electronic computing device 102, electronic computing device 104, smartphone 106 and electronic computing device 114.

The mass storage device 614 is connected to the CPU 602 through a mass storage controller (not shown) connected to the system bus 622. The mass storage device 614 and its associated computer-readable data storage media provide non-volatile, non-transitory storage for the financial institution server computer 110. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the financial institution server computer 110.

According to various embodiments of the invention, the financial institution server computer 110 may operate in a networked environment using logical connections to remote network devices through the network 108, such as a wireless network, the Internet, or another type of network. The financial institution server computer 110 may connect to the network 108 through a network interface unit 604 connected to the system bus 622. It should be appreciated that the network interface unit 604 may also be utilized to connect to other types of networks and remote computing systems. The financial institution server computer 110 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the financial institution server computer 110 can store software instructions and data. The software instructions include an operating system 618 suitable for controlling the operation of the financial institution server computer 110. The mass storage device 614 and/or the RAM 610 also store software instructions and software applications 616, that when executed by the CPU 602, cause the financial institution server computer 110 to provide the functionality of the financial institution server computer 110 discussed in this document. For example, the mass storage device 614 and/or the RAM 610 can store software instructions that, when executed by the CPU 602, cause the financial institution server computer 110 to display received data on the display screen of the financial institution server computer 110.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device for managing a communication session, the method comprising:
   at the electronic computing device, receiving a request to perform a task;
   dividing, by the electronic computing device, the task into two or more steps;
   identifying two or more user devices that can be used to perform two or more of the steps;
   assigning a user device from the two or more user devices for each of the steps;
   identifying one or more communication channels available to the two or more user devices;
   assigning one of the identified communication channels to the user device assigned for each respective step, including:
      allowing, by a customer service representative, manual assignment of at least one of the identified communication channels; and
      assigning, by a task manager using a rules engine, another of the identified communication channels;
   when at least one of the two or more user devices has moved into proximity of another of the two or more user devices, prompting a user to switch the communication session from the at least one of the two or more user devices to the another of the two or more user devices;
   upon receiving confirmation from the user, permitting the communication session to switch from the at least one of the two or more user devices to the another of the two or more of the user devices while maintaining continuity of the communication session; and
   switching the communication session to another communication channel of the identified communication channels while maintaining continuity of the communication session, including:
      sending a link to the another communication channel; and
      allowing use of the link to switch the communication session to the another communication channel.

2. The method of claim 1, further comprising:
   identifying a first user device and a first communication channel for performing a first step of the task;
   establishing the communication session with the first user device;
   monitoring a location of the first user device; and
   when the location of the first user device is within a first defined location, permit the communication session to switch to a second user device.

3. The method of claim 2, further comprising:
   generating a personal identification number (PIN) for the user at the first user device;
   sending the PIN to the first user device;
   receiving a login request from the second user device, the login request including the PIN; and
   using the PIN to login the user at the second user device and continue the communication session on the second user device.

4. The method of claim 2, further comprising:
   identifying a second communication channel of the communication session using the second user device;
   switching the communication session to the second communication channel using the second user device; and
   implementing a second step of the task using the second communication channel.

5. The method of claim 1, further comprising:
   identifying a first communication channel of the communication session for performing a first step of the task;
   identifying a second communication channel of the communication session for performing a second step of the task; and
   after completing the first step of the task using the first communication channel, switch the communication session to the second communication channel for performing the second step of the task.

6. The method of claim 1, wherein the one or more communication channels comprise one of a voice communication, an email message, a text message or an Internet connection to a web page.

7. The method of claim 1, further comprising:
   generating a personal identification number (PIN) for a user of the communication session; and
   using the PIN to establish a connection of one of the user devices to one of the communication channels.

8. The method of claim 7, wherein the PIN can be numeric, alphanumeric or biometric capable.

9. The method of claim 1, further comprising:
   identifying a first user at a first user device for performing a first step of the task in the communication session;
   identifying a second user at a second user device for performing a second step of the task in the communication session; and
   transferring the communication session to the second user at the second user device.

10. The method of claim 1, further comprising using a rules engine to determine optimal communication channels for the two or more steps of the task.

11. The method of claim 1, further comprising permitting a plurality of users on different user devices to perform different steps of the one or more steps of the task in the communication session.

12. The method of claim 11, further comprising restricting one or more of the steps of the task to specific geolocations.

13. The method of claim 1, further comprising rendering a user interface showing aspects of the communication session, the user interface permitting the communication session to be transferred between user devices and between communication channels.

14. A method implemented on an electronic computing device for managing a communication session, the method comprising:
   at the electronic computing device, receiving a first request from a smartphone to perform a task;
   dividing the task into two or more steps;
   assigning a first step of the task to be performed on the smartphone;
   assigning a second step of the task to be performed on a desktop computer;
   identifying one or more communication channels available to the smartphone and the desktop computer;
   assigning a first channel of the identified communication channels to the smartphone for the first step and assigning a second channel of the identified communication channels to the desktop computer for the second step, including:
      allowing, by a customer service representative, manual assignment of at least one of the identified communication channels; and
      assigning, by a task manager using a rules engine, another of the identified communication channels;
   establishing the communication session with the smartphone for the first step of the communication session;

determining that the smartphone has moved into a proximity of the desktop computer;
when the smartphone has moved into the proximity of the desktop computer, prompting a first user to switch the communication session from the smartphone to the desktop computer;
upon receiving confirmation from the first user, transferring the communication session to the desktop computer while maintaining continuity of the communication session;
performing the second step of the communication session on the desktop computer; and
switching the communication session on the desktop computer to a third communication channel of the identified communication channels while maintaining continuity of the communication session, including:
sending to the desktop computer a link to the third communication channel; and
allowing use of the link to switch the communication session to the third communication channel.

15. The method of claim 14, further comprising:
generating a personal identification number (PIN) for the communication session;
sending the PIN to the smartphone;
when the smartphone has moved into the proximity of the desktop computer, sending the PIN to the desktop computer;
receiving a second request from the desktop computer to be connected to the communication session, the second request including the PIN;
verifying that the PIN is valid; and
when the PIN is verified as being valid, transfer the communication session from the smartphone to the desktop computer.

16. The method of claim 14, further comprising switching the communication session from the first user at the smartphone to a second user at the desktop computer while maintain a continuity of the communication session.

17. A server computer comprising:
a processing unit; and
system memory, the system memory including instructions which, when executed by the processing unit, cause the server computer to:
receive a first request from a first electronic computing device to perform a task;
divide the task into two or more steps;
assign a first step of the task to be performed on the first electronic computing device;
assign a second step of the task to be performed on a second electronic computing device;
identify two or more available communication channels;
assign a first available communication channel for performing the first step of the task and a second available communication channel for performing the second step of the task, including to:
allow, by a customer service representative, manual assignment of the first available communication channel; and
assign, by a task manager using a rules engine, the second available communication channel;
establish a communication session between the first electronic computing device and the server computer using the first communication channel;
generate a personal identification number (PIN) for a user at the first electronic computing device;
send the PIN to the first electronic computing device;
receive a second request from the second electronic computing device to login to the server computer using the second communication channel, the second request including the PIN;
verify a validity of the PIN;
after verifying the validity of the PIN, prompting the user to switch the communication session from the first communication channel to the second communication channel;
upon receiving confirmation from the user, switch the communication session from the first communication channel to the second communication channel while maintaining continuity of the communication session; and
switch the communication session to a third communication channel while maintaining continuity of the communication session, including:
send a link to the third communication channel; and
allow use of the link to switch the communication session to the third communication channel.

* * * * *